United States Patent
Li

(10) Patent No.: US 9,479,746 B2
(45) Date of Patent: Oct. 25, 2016

(54) METHODS AND APPARATUS FOR DEMOSAICKING ARTIFACTS SUPPRESSION

(71) Applicant: Marvell World Trade Ltd., St. Michael (BB)

(72) Inventor: Huai Dong Li, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/587,961

(22) Filed: Dec. 31, 2014

(65) Prior Publication Data

US 2015/0195497 A1 Jul. 9, 2015

Related U.S. Application Data

(60) Provisional application No. 61/924,976, filed on Jan. 8, 2014.

(51) Int. Cl.
| | |
|---|---|
| *H04N 9/04* | (2006.01) |
| *G06T 3/40* | (2006.01) |
| *H04N 5/77* | (2006.01) |

(52) U.S. Cl.
CPC ............ *H04N 9/045* (2013.01); *G06T 3/4015* (2013.01); *H04N 5/772* (2013.01)

(58) Field of Classification Search
CPC ..... H04N 9/045; H04N 5/772; G06T 3/4015
USPC ........................................................ 348/273
See application file for complete search history.

(56) References Cited

U.S. PATENT DOCUMENTS

| | | | |
|---|---|---|---|
| 8,363,932 B2* | 1/2013 | Lee | G06T 5/003 |
| | | | 382/162 |
| 2002/0001409 A1 | 1/2002 | Chen | |
| 2005/0220337 A1 | 10/2005 | Arazaki | |
| 2009/0285480 A1* | 11/2009 | Bennett | G06K 9/40 |
| | | | 382/167 |
| 2010/0039563 A1 | 2/2010 | Lukac | |
| 2011/0182510 A1* | 7/2011 | Hong | G06T 3/4015 |
| | | | 382/167 |
| 2012/0063682 A1* | 3/2012 | Alacoque | G06T 3/4015 |
| | | | 382/167 |

FOREIGN PATENT DOCUMENTS

| | | |
|---|---|---|
| EP | 1367837 B1 | 3/2010 |
| EP | 1022912 B1 | 3/2011 |
| JP | 2000217123 A | 8/2000 |

OTHER PUBLICATIONS

Kayvon Fatahalian, "Lecture 16: A Camera's Image Processing Pipeline Part 1", CMU 15-869, Graphics and Imaging Architectures, Fall 2011, 32 pages.

(Continued)

*Primary Examiner* — Gevell Selby

(57) ABSTRACT

The present disclosure describes systems and techniques relating to demosaicking artifact suppression. According to an aspect of the described systems and techniques, a device includes: demosaicking circuitry configured to generate interpolated data from raw data received from an image sensor in a three color data format; first circuitry configured to filter a chrominance component of a luminance-chrominance data format version of the interpolated data to suppress false color; and second circuitry configured to filter a luminance component of the luminance-chrominance data format version of the interpolated data to suppress isolated dots.

21 Claims, 2 Drawing Sheets

(56) References Cited

OTHER PUBLICATIONS

Kayvon Fatahalian, "Lecture 17: A Camera's Image Processing Pipeline Part 2", CMU 15-869, Graphics and Imaging Architectures, Fall 2011, 38 pages.

Chan et al., "A Novel Color Interpolation Framework in Modified YCbCr Domain for Digital Cameras", IEEE, pp. 925-928, 2003.

Huang et al., "Image Pipeline Algorithms for Standard mobile Imaging Architecture Sensors", 18th IPPR Conference on Computer Vision, Graphics and Image Processing, pp. 1118-1125, 2005.

Authorized Officer Rosa Poquet, Notification of Transmittal of the International Search Report and the Written Opinion of the International Searching Authority, International Application No. PCT/IB2015/050132, mailed Mar. 18, 2015, 11 pages.

* cited by examiner

METHODS AND APPARATUS FOR DEMOSAICKING ARTIFACTS SUPPRESSION

CROSS REFERENCE TO RELATED APPLICATIONS

This application claims the benefit of the priority under 35 U.S.C. §119(e) from U.S. Provisional Application Ser. No. 61/924,976, filed Jan. 8, 2014 and entitled "Methods and Apparatus for Demosaicking Artifacts Suppression", which is hereby incorporated by reference.

BACKGROUND

The present disclosure describes systems and techniques relating to image processing methods and apparatus, and more particularly, to methods and apparatus for demosaicking artifact suppression.

Digital cameras often acquire imagery using a single-chip CCD (Charge Coupled Device) or CMOS (Complementary Metal Oxide Semiconductor) sensor whose surface is covered with a color filter array (CFA). The CFA consists of a set of spectrally selective filters that are arranged in an interleaving pattern so that each sensor pixel samples one of the three primary color values (for example, red, green and blue values). These sparsely sampled color values are referred to as CFA samples. To render a full-color image from the CFA samples, an image reconstruction process commonly referred to as CFA demosaicking is applied.

An immense number of demosaicking methods have been used in image processing pipelines. Many adaptive CFA demosaicking methods have been proposed to exploit the spectral and spatial correlations among neighboring pixels in order to have optimal reconstruction outputs. But even with the most advanced demosaicking methods, artifacts associated with this reconstruction process still arise. There are three basic types of demosaicking artifacts: (1) zipper artifacts refer to abrupt or unnatural changes of color differences between neighboring pixels, which manifest as an "on-off" pattern; (2) false color refers to noticeable color errors as compared to the original image, which occurs mostly around sharp edges; and (3) isolated dots refer to noticeable bright or dark spots, which occur in high spatial frequency areas with sharp edges.

SUMMARY

The present disclosure describes systems and techniques relating to demosaicking artifact suppression. According to an aspect of the described systems and techniques, a device includes: demosaicking circuitry configured to generate interpolated data from raw data received from an image sensor in a three color data format; first circuitry configured to filter a chrominance component of a luminance-chrominance data format version of the interpolated data to suppress false color; and second circuitry configured to filter a luminance component of the luminance-chrominance data format version of the interpolated data to suppress isolated dots.

The first circuitry can include a tree-structure based filter. The tree-structure based filter can include one or more median filters that operate on (i) each respective row or column of a kernel to generate an array of values, and (ii) the array of values to generate a final value for a center pixel of the kernel. The kernel can be a 5×5 kernel, and the array of values can be a five value array.

The second circuitry can include a maxima and minima comparison filter. The maxima and minima comparison filter can be configured to (i) replace a center pixel value of a kernel with a second to maximum pixel value in the kernel when the center pixel value is a maximum pixel value in the kernel and a difference between the maximum pixel value and the second to maximum pixel value exceeds a first threshold, and (ii) replace the center pixel value of the kernel with a second to minimum pixel value in the kernel when the center pixel value is a minimum pixel value in the kernel and a difference between the minimum pixel value and the second to minimum pixel value exceeds a second threshold. The first threshold can depend on the maximum pixel value in the kernel and a tuning parameter, and the second threshold can depend on the minimum pixel value in the kernel and a tuning parameter. Further, each of the isolated dots can be either a bright spot or a dark spot, and the kernel can be a 3×3 kernel.

According to another aspect of the described systems and techniques, a method includes: obtaining raw data from an image sensor, demosaicking the raw data from the image sensor to generate interpolated data in a three color data format; obtaining a luminance-chrominance data format version of the interpolated data; suppressing false color in the luminance-chrominance version of the interpolated data by filtering a chrominance component of the luminance-chrominance version of the interpolated data; and suppressing one or more isolated dots in the luminance-chrominance version of the interpolated data by filtering a luminance component of the luminance-chrominance version of the interpolated data.

The demosaicking can include demosaicking the raw data from the image sensor to generate the interpolated data in the three color data format having a first bit depth, the obtaining can include obtaining the luminance-chrominance version of the interpolated data having a second bit depth that is less than the first bit depth, suppressing the false color in the luminance-chrominance version of the interpolated data can include applying a first filter to the chrominance component of the luminance-chrominance version of the interpolated data, and suppressing the one or more isolated dots in the luminance-chrominance version of the interpolated data can include applying a second filter, which is different than the first filter, to the luminance component of the luminance-chrominance version of the interpolated data.

Suppressing the false color in the luminance-chrominance version of the interpolated data can include: median filtering a first chrominance component in separate sets of data to produce first chrominance output data; median filtering the first chrominance output data to produce a final data value for the first chrominance component; median filtering a second chrominance component in the separate sets of data to produce second chrominance output data; and median filtering the second chrominance output data to produce a final data value for the second chrominance component. The first chrominance component can be a Cr component of a YCrCb color space, the second chrominance component can be a Cb component of the YCrCb color space, the first bit depth is ten, and the second bit depth is eight.

Suppressing the false color in the luminance-chrominance version of the interpolated data can include providing the separate sets of data for median filtering the first chrominance component and the second chrominance component using a 5×5 kernel. Suppressing the one or more isolated dots in the luminance-chrominance version of the interpolated data can include: identifying a maximum pixel value and a second to maximum pixel value in a kernel; identifying a minimum pixel value and a second to minimum pixel value in the kernel; replacing a center pixel value of the kernel with the second to maximum pixel value when the center pixel value in the kernel is the maximum pixel value and a difference between the maximum pixel value and the second to maximum pixel value exceeds a first threshold; and replacing the center pixel value of the kernel with the second to minimum pixel value when the center pixel value in the kernel is the minimum pixel value and a difference between the minimum pixel value and the second to minimum pixel value exceeds a second threshold.

The method can include: calculating the first threshold from the maximum pixel value in the kernel and a tuning parameter; and calculating the second threshold from the minimum pixel value in the kernel and a tuning parameter. The kernel can be a 3×3 kernel, the luminance component can be a Y component of a YCrCb color space, the first bit depth can be ten, and the second bit depth can be eight.

According to another aspect of the described systems and techniques, an apparatus includes: an optical input structure; an image sensor to receive light through the optical input structure; a user interface device; and one or more integrated circuit chips coupled with the image sensor and the user interface device; wherein the one or more integrated circuit chips include a demosaicking stage configured to generate interpolated data from raw data received from the image sensor in a three color data format; wherein the one or more integrated circuit chips include a color space conversion stage configured to convert the interpolated data from the three color data format to a luminance-chrominance data format; wherein the one or more integrated circuit chips include a false color suppression stage configured to filter a chrominance component of the interpolated data in the luminance-chrominance data format; and wherein the one or more integrated circuit chips include an isolated spots suppression stage configured to filter a luminance component of the interpolated data in the luminance-chrominance data format.

The isolated spots suppression stage can include a 3×3 kernel based maximum and minimum replacement filter. The 3×3 kernel based maximum and minimum replacement filter can employ thresholds that depend on a maximum pixel value in the 3×3 kernel, a minimum pixel value in the 3×3 kernel, and a tuning parameter. The false color suppression stage can include a 5×5 kernel based hierarchical median filter. In addition, the color space conversion stage can convert data from RGB format to YCrCb format.

The described systems and techniques can result in an improved image processing pipeline for digital cameras, which can be used in many different electronic devices. False color need not be completely eliminated in the demosaicking stage, and in some implementations, the demosaicking stage need not address false color artifacts at all. False color artifacts introduced by the demosaicking stage can be suppressed in a later stage of an image processing pipeline (e.g., in the YCbCr domain). Likewise, isolated dot artifacts that arise from the processing in the demosaicking stage can also be suppressed in a later stage of an image processing pipeline (e.g., in the YCbCr domain).

Different suppression methods can be applied in different domains of the image processing pipeline based on the different types of artifacts. This can result in a cost effective approach for the image processing pipeline that can suppress false color and isolated dots artifacts very effectively while preserving image details. Suppressing these types of artifacts in a lower bit depth part of the image processing pipeline can save on hardware implementation costs. Moreover, the line buffer can be shared with an edge sharpening block, which is normally applied in a luminance domain, thus further simplifying the image processing pipeline architecture.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1:
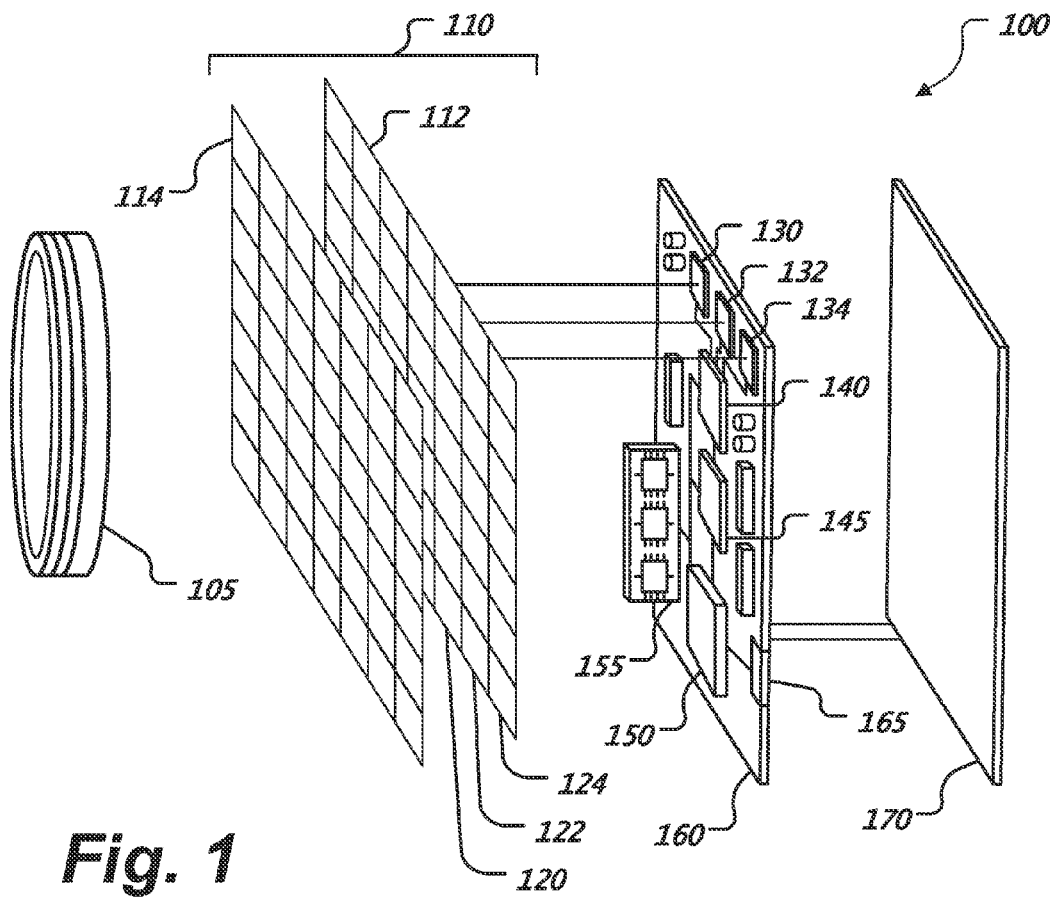
FIG. 1 shows an exploded view of portions of a digital camera apparatus.

FIG. 1 shows an exploded view of portions of a digital camera apparatus 100. An optical input structure 105 allows light to be focused on an image sensor 110. The optical input structure 105 can include one or more lens, a shutter, a diaphragm, and other structures, depending on the nature of the apparatus 100. Digital cameras can be included in many different types of electronic devices. For example, the apparatus 100 can be a standalone digital camera, a smartphone, a tablet computer, etc. In addition, the apparatus 100 can include other components that are not shown, such as an infrared focus sensor, a flash, a battery compartment, etc.

In some implementations, the image sensor 110 includes a CCD (charge coupled device) 112. In some implementations, the image sensor 110 includes a CMOS (Complementary Metal Oxide Semiconductor) sensor 112. The CCD or CMOS sensor 112 has its surface covered with a CFA (color filter array) 114, which consists of a set of spectrally selective filters that cause each of the sensor pixels to sample one of three primary color values, for example, a red sensor pixel 120, green sensor pixel 122, and blue sensor pixel 124. Although shown in FIG. 1 as aligned in columns, it will be appreciated that the spectrally selective filters are typically arranged in an interleaving pattern, and different patterns are possible. In some implementations, a Bayer CFA pattern is used. Moreover, although shown in the exploded view of FIG. 1 as separate structures, it will be appreciated that the components of the image sensor 110 can be implemented on a single integrated circuit chip.

The apparatus 100 can include one or more circuit boards 160, which hold circuits for an image processing pipeline (ISP) and can hold other circuits as well. These various circuits can be separated into multiple integrated circuit chips that each connect to the circuit board(s) 160, as shown in FIG. 1. In some implementations, the circuit board(s) 160 can also hold circuits for lens, focus and contrast control, analog to digital conversion (ADC), and data compression. For example, the image sensor 110 can output analog signals of an image in an RGB (Red, Green, Blue) format, and three ADCs 130, 132, 134 can convert these analog signals into digital signals. In other implementations, the ADCs 130, 132, 134 are included in the image sensor 110.

In any case, the output of the ADCs 130, 132, 134 can be sparsely sampled color values, referred to as CFA samples.

Because the CFA samples are sparse, interpolation is needed to generate an R channel image, a G channel image, and a B channel image. Thus, the ISP includes demosaicking circuitry to perform the image reconstruction process. The ISP is shown in FIG. 1 as being separated between a first integrated circuit chip 140 and a second integrated circuit chip 145. However, other configurations are possible. In general, the ISP includes multiple stages, which can be implemented in one or more integrated circuit chips. These stages can include optical black clamp, white balance, color interpolation (demosaicking), denoise, gamma correction, one or more color space conversions, saturation enhancement, color correction, edge enhancement, and image compression.

In some implementations, an embedded processor chip 150 controls the ISP, a storage device 155 (e.g., a Random Access Memory (RAM), which can include volatile memory, non-volatile memory, or both), one or more user interface devices 170, and one or more input/output structures 165. The input/output structure(s) 165 can include a USB (Universal Serial Bus) port, a memory storage stick port, etc. The user interface device(s) 170 can include a multi-touch display screen.

The first integrated circuit chip 140 can include a demosaicking stage with circuitry that receives the raw data from an image sensor in the three color data format (e.g., RGB data from a white balance stage) and generates interpolated data therefrom. In some implementations, the bit depth of the raw data received by demosaicking stage is 10 bits (i.e., each pixel has each of its three colors represented by a 10 bit data value). The circuitry of the demosaicking stage can implement various types of demosaicking algorithms, which can be designed to determine interpolation direction reliably enough to avoid zipper artifacts in the interpolated data that is generated.

The first or second integrated circuit chips 140, 145 can also include a gamma correction stage and one or more color conversion stages. A last color conversion stage can provide a version of the interpolated data (after appropriate processing) in a luminance-chrominance data format. For example, the luminance-chrominance data format can be YCbCr, Y'CbCr, or YUV. Other luminance-chrominance data formats are possible. In general, the format represents the image using a luminance channel (light intensity) and two chrominance channels (intensities of two colors relative to a third color). In addition, the bit depth of the luminance-chrominance version of the interpolated data can be less than that of the raw data. For example, the bit depth can be 8 bits (i.e., each pixel has each of its three channels represented by an 8 bit data value). In some cases, the chrominance channels can have a bit depth that is less than that of the luminance channel.

The first or second integrated circuit chips 140, 145 can include circuitry that filters a chrominance component of the luminance-chrominance data format version of the interpolated data. This is done to suppress false color that is not eliminated within the demosaicking stage. Suppressing false color in this later stage in the ISP, when the data is at a lower bit depth, can reduce the amount of circuitry needed and thus reduce costs of the device. In some implementations, the demosaicking stage need not attempt to eliminate false color artifacts at all, rather relying on the false color suppression of the later stage.

The first or second integrated circuit chips 140, 145 can also include circuitry that filters a luminance component of the luminance-chrominance data format version of the interpolated data. This is done to suppress isolated dots that can arise from the processing done in the demosaicking stage. Note that isolated dots can arise when the interpolation is done in a color difference domain, and such techniques are generally regarded as advanced methods for interpolation. By also suppressing isolated dots in this later stage in the ISP, when the data is at a lower bit depth, the amount of circuitry needed can be further reduced, thus further reducing costs of the device. Note that the line buffer can be shared with an edge sharpening block, which is normally applied in the Y domain. In some implementations, the demosaicking stage need not be concerned with the introduction of isolated dots, rather relying on the isolated dots suppression of the later stage.

Figure 2:
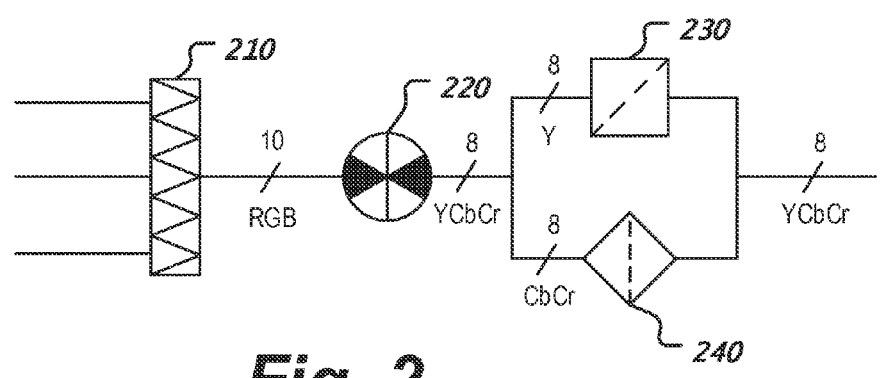
FIG. 2 shows a schematic view of a portion of an image processing pipeline.

FIG. 2 shows a schematic view of a portion of an image processing pipeline. Demosaicking circuitry 210 receives raw data from an image sensor, which may have been processed by other circuitry, such as for white balance. The demosaicking circuitry 210 generates interpolated data from the raw data in an RGB format with a bit depth of 10. Color space conversion circuitry 220 receives the RGB data and converts it to YCbCr data with a bit depth of 8. First filter circuitry 230 can include a maxima and minima comparison filter that operates on a Y channel of the YCbCr data. Second filter circuitry 240 can include a tree-structure based filter that operates on the Cb channel, the Cr channel, or both.

Although shown in FIG. 2 as operating in parallel, in some implementations, the first filter circuitry 230 and the second filter circuitry 240 operate in series, in which case either can come before the other. In addition, each of the first filter circuitry 230 and the second filter circuitry 240 can reuse circuit elements to perform their operations in series, or duplicate their circuit elements as needed to perform parallel processing, based on an amount of processing speed versus cost savings for the hardware, as desired for a given implementation. Finally, each of the first filter circuitry 230 and the second filter circuitry 240 can operate using different kernel sizes.

Figure 3:
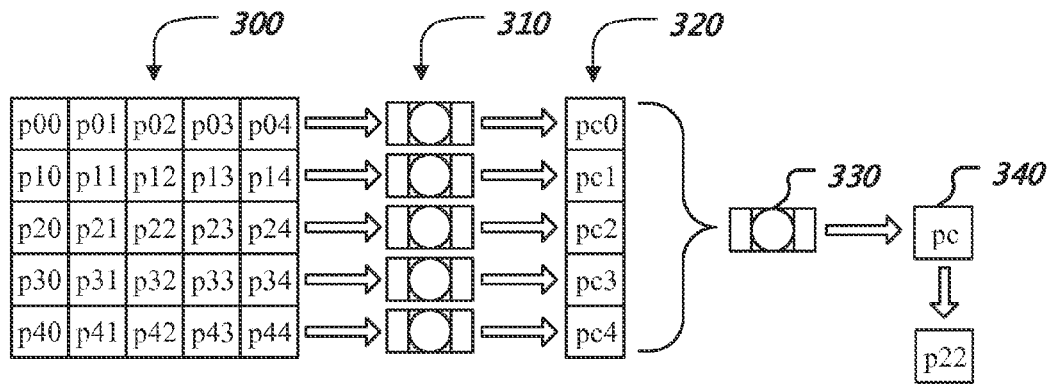
FIG. 3 shows an example of a tree-structure based filter that operates on a chrominance component of image data in a luminance-chrominance data format.

FIG. 3 shows an example of a tree-structure based filter that operates on a chrominance component of image data in a luminance-chrominance data format. A 5×5 kernel 300 provides the input pixel (p) values (in columns 0-4 and rows 0-4) of Cb or Cr data in a YCbCr color space. In some implementations, the 5×5 kernel centered at p22 location in FIG. 3 is applied to both the Cb and Cr channels respectively to suppress false color artifacts in the received data. Note that a feedback scheme can be used, where the filtered data is fed into raw data again for a next round of filtering, or a non-feedback scheme can be used, where filtered data is output directly. In some implementations, both schemes can be supported. In any case, the 5×5 kernel data around a current center pixel (p22 in FIG. 3) is processed in five rows with a set of five median filters 310. The pixel center (pc) output of each row then forms a new array 320, which is processed by a one dimensional median filter 330 to generate a final pixel center output 340, which replaces the original center pixel (p22).

In other implementations a two dimensional median filter can be used. However, using the hierarchical median filtering, as shown in FIG. 3, saves circuitry costs while still providing a high quality result. In addition, the use of such tree-structure filtering can provide effective false color suppression while also preserving edges in the image data. In some implementations, kernel sizes other than 5×5 are can be applied with varying hardware costs.

Figure 4:
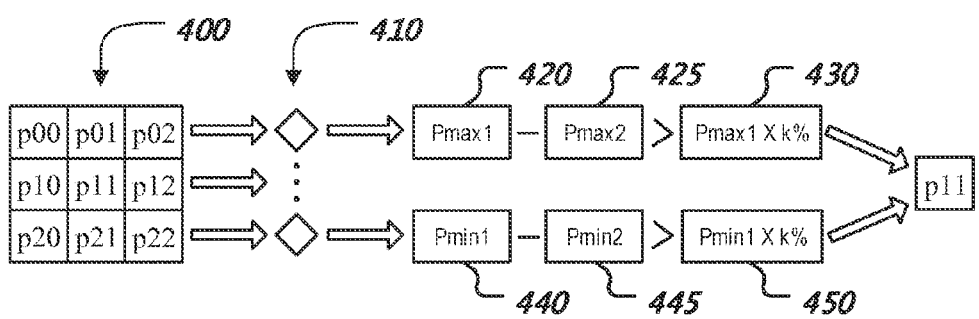
FIG. 4 shows an example of a maxima and minima comparison filter that operates on a luminance component of image data in a luminance-chrominance data format.

FIG. 4 shows an example of a maxima and minima comparison filter that operates on a luminance component of image data in a luminance-chrominance data format. A 3×3 kernel 400 provides the input pixel (p) values (columns 0-2 and rows 0-2) of Y data in a YCbCr color space. Isolated dots artifacts are often a result of improper interpolation of green values, and filtering in the Y domain can be an effective approach for suppression of isolated dots. The 3×3 kernel data around a current center pixel (p11 in FIG. 4) is processed by comparison circuitry 410 to find the maximum value (Pmax1) 420, the second maximum value (Pmax2) 425, the minimum value (Pmin1) 440, and the second minimum value (Pmin2) 445.

If the center pixel (p11) is the maximum value (Pmax1) 420, the maximum value (Pmax1) 420 is compared with the second maximum value (Pmax2) 425. If the difference between Pmax1 420 and Pmax2 425 exceeds a threshold 430, the center pixel value (p11) is replaced with the second maximum value (Pmax2) 425 (i.e., p11=Pmax2). If the center pixel (p11) is the minimum value (Pmin1) 440, the minimum value (Pmin1) 440 is compared with the second minimum value (Pmin2) 445. If the difference between Pmin1 440 and Pmin2 445 exceeds a threshold 450, the center pixel value (p11) is replaced with the second minimum value (Pmin2) 445 (i.e., p11=Pmin2).

In some implementations, one or both of the thresholds 430, 450 can depend on a maximum pixel value, a minimum pixel value, a tuning parameter, or a combination of these. For example, the threshold 430 can be set equal to the maximum value (Pmax1) 420 times a tuning parameter k % (a number between 0 and 1), and the threshold 450 can be set equal to the minimum value (Pmin1) 440 times a tuning parameter k % (a number between 0 and 1). In some implementations, a single tuning parameter, k1, is used for both the maximum threshold 430 and the minimum threshold 450. Moreover, the one or more tuning parameters used with the adjustable thresholds 430, 450 can be set experimentally based on the specific image processing pipeline of a given implementation. In some implementations, the one or more tuning parameters can have value(s) that are tuned based on capture condition(s), such as sensor analog gain.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof. While this specification contains many specifics, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A device comprising:
   demosaicking circuitry configured to generate interpolated data from raw data received from an image sensor in a three color data format;
   first circuitry configured to filter a chrominance component of a luminance-chrominance data format version of the interpolated data to suppress false color; and
   second circuitry configured to filter a luminance component of the luminance-chrominance data format version of the interpolated data to suppress isolated dots.

2. The device of claim 1, wherein the first circuitry comprises a tree-structure based filter.

3. The device of claim 2, wherein the tree-structure based filter comprises one or more median filters that operate on (i) each respective row or column of a kernel to generate an array of values, and (ii) the array of values to generate a final value for a center pixel of the kernel.

4. The device of claim 3, wherein the kernel is a 5×5 kernel, and the array of values is a five value array.

5. The device of claim 2, wherein the second circuitry comprises a maxima and minima comparison filter.

6. The device of claim 5, wherein the maxima and minima comparison filter is configured to (i) replace a center pixel value of a kernel with a second to maximum pixel value in the kernel when the center pixel value is a maximum pixel value in the kernel and a difference between the maximum pixel value and the second to maximum pixel value exceeds a first threshold, and (ii) replace the center pixel value of the kernel with a second to minimum pixel value in the kernel when the center pixel value is a minimum pixel value in the kernel and a difference between the minimum pixel value and the second to minimum pixel value exceeds a second threshold.

7. The device of claim 6, wherein the first threshold depends on the maximum pixel value in the kernel and a tuning parameter, and the second threshold depends on the minimum pixel value in the kernel and a tuning parameter.

8. The device of claim 7, wherein each of the isolated dots is either a bright spot or a dark spot, and the kernel is a 3×3 kernel.

9. A method comprising:
   obtaining raw data from an image sensor;
   demosaicking the raw data from the image sensor to generate interpolated data in a three color data format;
   obtaining a luminance-chrominance data format version of the interpolated data;
   suppressing false color in the luminance-chrominance version of the interpolated data by filtering a chrominance component of the luminance-chrominance version of the interpolated data; and
   suppressing one or more isolated dots in the luminance-chrominance version of the interpolated data by filtering a luminance component of the luminance-chrominance version of the interpolated data.

10. The method of claim 9, wherein the demosaicking comprises demosaicking the raw data from the image sensor to generate the interpolated data in the three color data format having a first bit depth, the obtaining comprises obtaining the luminance-chrominance version of the interpolated data having a second bit depth that is less than the first bit depth, suppressing the false color in the luminance-chrominance version of the interpolated data comprises applying a first filter to the chrominance component of the luminance-chrominance version of the interpolated data, and suppressing the one or more isolated dots in the luminance-chrominance version of the interpolated data comprises applying a second filter, which is different than the first filter, to the luminance component of the luminance-chrominance version of the interpolated data.

11. The method of claim 10, wherein suppressing the false color in the luminance-chrominance version of the interpolated data comprises:
   median filtering a first chrominance component in separate sets of data to produce first chrominance output data;
   median filtering the first chrominance output data to produce a final data value for the first chrominance component;
   median filtering a second chrominance component in the separate sets of data to produce second chrominance output data; and
   median filtering the second chrominance output data to produce a final data value for the second chrominance component.

12. The method of claim 11, wherein the first chrominance component is a Cr component of a YCrCb color space, the second chrominance component is a Cb component of the YCrCb color space, the first bit depth is ten, and the second bit depth is eight.

13. The method of claim 11, wherein suppressing the false color in the luminance-chrominance version of the interpolated data comprises providing the separate sets of data for median filtering the first chrominance component and the second chrominance component using a 5×5 kernel.

14. The method of claim 10, wherein suppressing the one or more isolated dots in the luminance-chrominance version of the interpolated data comprises:
   identifying a maximum pixel value and a second to maximum pixel value in a kernel;
   identifying a minimum pixel value and a second to minimum pixel value in the kernel;
   replacing a center pixel value of the kernel with the second to maximum pixel value when the center pixel value in the kernel is the maximum pixel value and a difference between the maximum pixel value and the second to maximum pixel value exceeds a first threshold; and
   replacing the center pixel value of the kernel with the second to minimum pixel value when the center pixel value in the kernel is the minimum pixel value and a difference between the minimum pixel value and the second to minimum pixel value exceeds a second threshold.

15. The method of claim 14, comprising:
   calculating the first threshold from the maximum pixel value in the kernel and a tuning parameter; and
   calculating the second threshold from the minimum pixel value in the kernel and a tuning parameter.

16. The method of claim 14, wherein the kernel is a 3×3 kernel, the luminance component is a Y component of a YCrCb color space, the first bit depth is ten, and the second bit depth is eight.

17. An apparatus comprising:
   an optical input structure;
   an image sensor to receive light through the optical input structure;
   a user interface device; and
   one or more integrated circuit chips coupled with the image sensor and the user interface device;
   wherein the one or more integrated circuit chips include a demosaicking stage configured to generate interpolated data from raw data received from the image sensor in a three color data format;
   wherein the one or more integrated circuit chips include a color space conversion stage configured to convert the interpolated data from the three color data format to a luminance-chrominance data format;
   wherein the one or more integrated circuit chips include a false color suppression stage configured to filter a chrominance component of the interpolated data in the luminance-chrominance data format; and
   wherein the one or more integrated circuit chips include an isolated spots suppression stage configured to filter a luminance component of the interpolated data in the luminance-chrominance data format.

18. The apparatus of claim 17, wherein the isolated spots suppression stage comprises a 3×3 kernel based maximum and minimum replacement filter.

19. The apparatus of claim 18, wherein the 3×3 kernel based maximum and minimum replacement filter employs thresholds that depend on a maximum pixel value in the 3×3 kernel, a minimum pixel value in the 3×3 kernel, and a tuning parameter.

20. The apparatus of claim 18, wherein the false color suppression stage comprises a 5×5 kernel based hierarchical median filter.

21. The apparatus of claim 20, wherein the color space conversion stage converts data from RGB format to YCrCb format.

* * * * *